US011588646B2

(12) United States Patent
Ilany et al.

(10) Patent No.: US 11,588,646 B2
(45) Date of Patent: Feb. 21, 2023

(54) IDENTITY-BASED APPLICATION AND FILE VERIFICATION

(71) Applicant: Portshift Software Technologies LTD., Tel Aviv-Jaffa (IL)

(72) Inventors: Ran Ilany, Hod Hasharon (IL); Alexei Kravtsov, Petah Tikva (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 352 days.

(21) Appl. No.: 17/014,136

(22) Filed: Sep. 8, 2020

(65) Prior Publication Data
US 2021/0075626 A1 Mar. 11, 2021

Related U.S. Application Data

(60) Provisional application No. 62/896,284, filed on Sep. 5, 2019.

(51) Int. Cl.
*H04L 9/40* (2022.01)
*H04L 9/32* (2006.01)
(Continued)

(52) U.S. Cl.
CPC .......... *H04L 9/3247* (2013.01); *G06F 11/302* (2013.01); *G06F 11/3476* (2013.01);
(Continued)

(58) Field of Classification Search
CPC ... H04L 9/3247; H04L 9/0643; G06F 16/137; G06F 16/1734; G06F 11/302; G06F 11/3476; G06F 21/6218
See application file for complete search history.

(56) References Cited

U.S. PATENT DOCUMENTS 7,793,835 B1 9/2010 Coggeshall et al.
8,392,881 B1 * 3/2013 Lund ................ G06F 8/315
717/116
(Continued)

FOREIGN PATENT DOCUMENTS

CA 2703719 C 7/2014
JP 5933786 B2 6/2016

OTHER PUBLICATIONS

"Agua Security MicroScanner—Scan Your Container Images for Package Vulnerabilities with Agua Security" Jun. 2020, https://github.com/aquasecurity/microscanner.
(Continued)

*Primary Examiner* — Ghodrat Jamshidi
(74) *Attorney, Agent, or Firm* — Baker Botts L.L.P.

(57) ABSTRACT

A system and method for establishing application identities including application runtime properties. A method includes signing at least one artifact of a first application communicating with a second application, wherein each of the at least one artifact includes data used for executing the first application, wherein a signing result of each artifact is a signed cryptographic hash of the artifact; monitoring events related to communications between the first application and the second application to identify a file event; generating at least one runtime hash for the file event, wherein the at least one runtime hash represents runtime properties of the first application; and generating an application identity for the first application, the application identity for the first application including the signed cryptographic hash of each of the at least one artifact and the at least one runtime hash of the file event.

17 Claims, 6 Drawing Sheets

(51) Int. Cl.
  *G06F 11/30* (2006.01)
  *G06F 11/34* (2006.01)
  *G06F 16/17* (2019.01)
  *G06F 16/13* (2019.01)
  *G06F 21/62* (2013.01)
  *H04L 9/06* (2006.01)

(52) U.S. Cl.
  CPC ........ *G06F 16/137* (2019.01); *G06F 16/1734* (2019.01); *G06F 21/6218* (2013.01); *H04L 9/0643* (2013.01)

(56) References Cited

U.S. PATENT DOCUMENTS

| | | | |
|---|---|---|---|
| 8,505,078 | B2 | 8/2013 | Hohlfeld et al. |
| 9,065,637 | B2 | 6/2015 | Spector et al. |
| 9,647,833 | B2 | 5/2017 | Yoon et al. |
| 10,536,278 | B1* | 1/2020 | Donaldson ............ H04L 9/3247 |
| 10,635,429 | B2* | 4/2020 | Singh ........................ G06F 8/65 |
| 11,086,998 | B2* | 8/2021 | Martinez ................. G06F 21/44 |
| 2005/0039016 | A1* | 2/2005 | Aissi ................... H04L 63/0823 |
| | | | 713/176 |
| 2012/0324238 | A1* | 12/2012 | Senda ..................... G06F 21/57 |
| | | | 713/189 |
| 2013/0111591 | A1* | 5/2013 | Topan ................. H04L 63/1408 |
| | | | 726/24 |
| 2014/0137264 | A1* | 5/2014 | Bilogrevic .............. G06F 21/54 |
| | | | 726/27 |
| 2014/0325592 | A1* | 10/2014 | Unagami ............... G06Q 30/02 |
| | | | 726/1 |
| 2016/0350529 | A1* | 12/2016 | Kerr ........................ G06F 21/51 |
| 2019/0319807 | A1* | 10/2019 | Fairfax ............... H04L 63/0823 |

OTHER PUBLICATIONS

"Getting Vulnerabilities and Metadata for Images", Google Cloud, Jun. 30, 2020., https://cloud.google.com/container-registry/docs/get-image-vulnerabilities.

"Grafeas: An Open Artifact Metadata API to Audit and Govern Your Software Supply Chain", Grafeas Authors, 2017, https://grafeas.io/.

"IBM Portieris: A Kubernetes Admission Controller for Verifying Image Trust with Notary", GitHub, vol. 0.8.0, https://github.com/IBM/portieris.

"In-toto: A Framework to Secure the Integrity of Software Supply Chains", vol. CC-BY-4.0, 2020 Github, in-toto Authors, https://in-toto.github.io/.

"Quay Container Registry", Red Hat Open Shift, https://www.openshift.com/products/quay.

"Vulnerability Static Analysis for Containers", GitHub, vol. 2.1.4, Jun. 1, 2020, https://github.com/coreos/clair.

Rice, et al., "Kubernetes Security: How to Build and Operate Applications Securely on Kubernetes", O'Reilly Book, Nov. 2018, https://kubernetes-security.info/#securing-your-container-images.

* cited by examiner

IDENTITY-BASED APPLICATION AND FILE VERIFICATION

CROSS-REFERENCE TO RELATED APPLICATIONS

This application claims the benefit of U.S. Provisional Application No. 62/896,284 filed on Sep. 5, 2019, the contents of which are hereby incorporated by reference.

All of the applications referenced above are hereby incorporated by reference.

TECHNICAL FIELD

The present disclosure relates generally to cybersecurity, and more specifically to identity-based security techniques for protecting cloud applications.

BACKGROUND

Cloud computing platforms provide storage and computational resources deployed at remote locations. The infrastructure of the cloud computing platform is a collection of networked systems typically including a large number of nodes distributed throughout one or more data centers in which each node provides the resources of a physical machine or a virtual machine running on a physical host.

Cloud computing platforms are ever-changing environments where applications, services, and virtual instances may be added, removed, scaled up or down, or upgraded on demand. Due to the complexity of such platforms, operations related to resolving security incidents, deploying virtual instances, and implementing network control or security policies are performed by development operations (DevOps) personnel. This is currently a costly and inefficiently managed process.

Further, network control policies imposed on cloud computing platforms contribute to challenges in incident management and deployment. In particular, many cloud computing platforms are subject to network control policies that would limit access to certain data, and specifically would limit the interactions between applications and services executed in the cloud computing platforms.

Sufficiently protecting a typical tenant environment in a cloud computing platform requires defining and managing sets of rules as part of the network control policies. Managing thousands of such rules with currently available tools creates complexity, blind spots, and misconfigurations. The result is that rulesets are fundamentally impossible to manage at scale. Moreover, there are no practical solutions for controlling managed services or Application Programming Interface (API) keys.

Further, even if such policies are properly defined and enforced, existing solutions cannot protect allowable connections or access to data. For example, applications can communicate with unrestricted connections, and are therefore vulnerable to security breaches, malicious activity, or cyber threats traveling through such a connection.

In addition, the network control policies may dynamically protect the virtual instances in the cloud computing application. The identifiers and network addresses of such instances constantly change. Further, in some cases, the network addresses may be masked or translated. Thus, the actual address of a virtual instance may not be apparent to define or enforce a rule within such a policy.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for establishing application identities including application runtime properties. The method comprises: signing at least one artifact of a first application communicating with a second application, wherein each of the at least one artifact includes data used for executing the first application, wherein a signing result of each artifact is a signed cryptographic hash of the artifact; monitoring events related to communications between the first application and the second application to identify a file event; generating at least one runtime hash for the file event, wherein the at least one runtime hash represents runtime properties of the first application; and generating an application identity for the first application, the application identity for the first application including the signed cryptographic hash of each of the at least one artifact and the at least one runtime hash of the file event.

Certain embodiments disclosed herein also include a non-transitory computer readable medium having stored thereon causing a processing circuitry to execute a process, the process comprising: signing at least one artifact of a first application communicating with a second application, wherein each of the at least one artifact includes data used for executing the first application, wherein a signing result of each artifact is a signed cryptographic hash of the artifact; monitoring events related to communications between the first application and the second application to identify a file event; generating at least one runtime hash for the file event, wherein the at least one runtime hash represents runtime properties of the first application; and generating an application identity for the first application, the application identity for the first application including the signed cryptographic hash of each of the at least one artifact and the at least one runtime hash of the file event.

Certain embodiments disclosed herein also include a system for establishing application identities including application runtime properties. The system comprises: a processing circuitry; and a memory, the memory containing instructions that, when executed by the processing circuitry, configure the system to: sign at least one artifact of a first application communicating with a second application, wherein each of the at least one artifact includes data used for executing the first application, wherein a signing result of each artifact is a signed cryptographic hash of the artifact; monitor events related to communications between the first application and the second application to identify a file event; generate at least one runtime hash for the file event, wherein the at least one runtime hash represents runtime properties of the first application; and generate an application identity for the first application, the application identity for the first application including the signed cryptographic hash of each of the at least one artifact and the at least one runtime hash of the file event.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1:
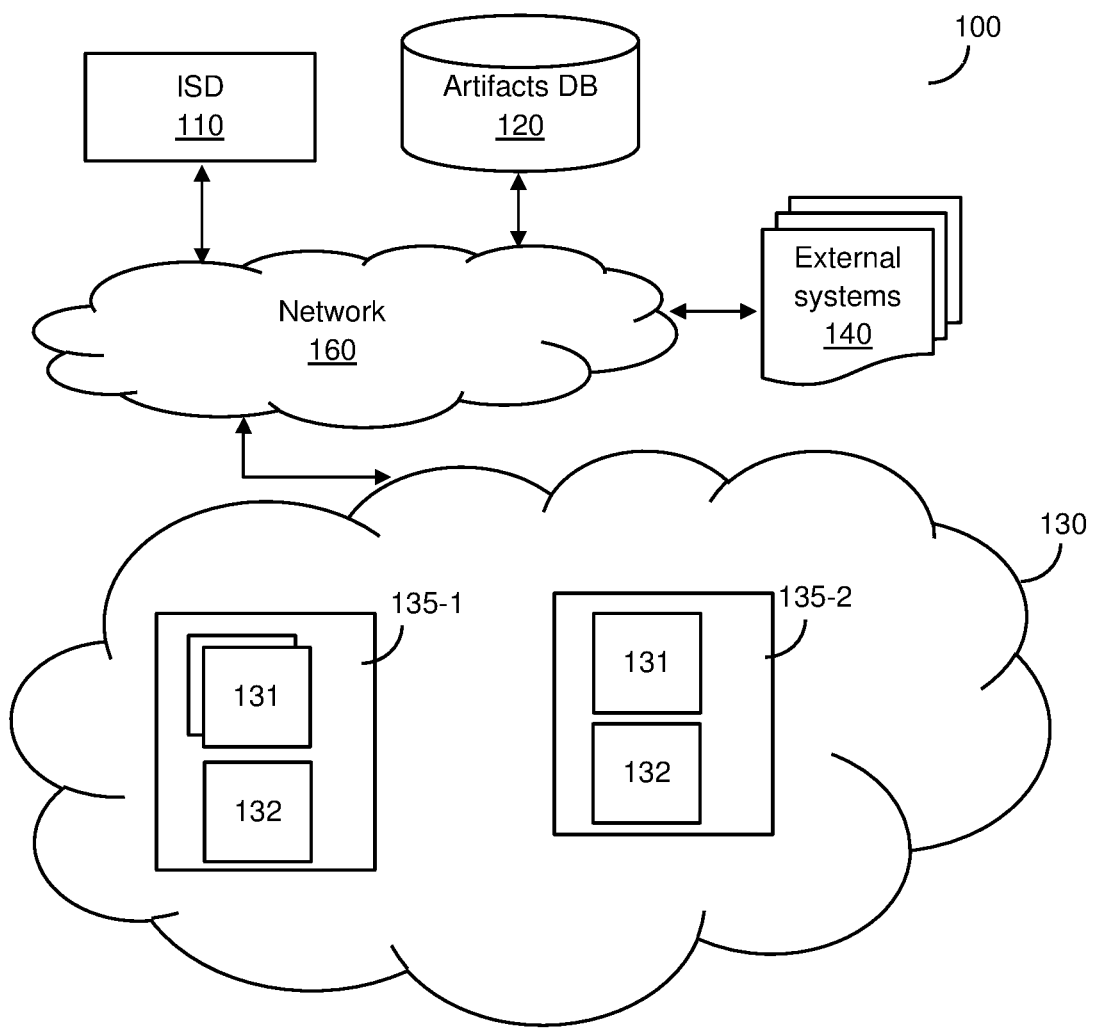
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein include systems and methods for verifying application identities. The disclosed application identities include at least signed hashes of static files as well as runtime properties of each identified application. Thus, an application identity effectively defines a given application as a set of static files exhibiting certain runtime properties.

The disclosed embodiments provide application identities which are more secure and less likely to be successfully impersonated, for example, by using stolen authentication credentials or static identifiers. More specifically, by utilizing runtime properties when establishing application identity, the application identity may be correlated to a specific application based on its runtime behaviors, thereby ensuring that applications exhibiting unusual or otherwise impermissible properties while running are not identified inaccurately.

The disclosed embodiments provide techniques for verifying application identities that do not require that application identities provided by applications be defined by a network control policy. The disclosed embodiments may be applied, for example, in cloud computing platforms. The disclosed embodiments further provide techniques for securely establishing the application identities described herein.

The disclosed embodiments further provide techniques for distinguishing between files that should not be changed at runtime while the application is online and files that can be changed while online. In an embodiment, only files that are not changed at runtime are used for the application identity. This, in turn, allows for performing signature-based verification only for files whose signatures are not expected to change while online, which results in improved accuracy of verification (more specifically, fewer false negatives).

In an embodiment, an application identity is generated for an application. The application identity for each application at least includes one or more signed hashes and a set of runtime properties of the application, and may further include authentication credentials such as a public-private key pair. The signed hashes of each application identity are generated based on a collection of attributes characterizing the application including signatures of files (e.g., execution and configuration files) that are signed offline. That is, for each file of an application, a cryptographic hash is computed. The cryptographic hashes are signed using a private key to prevent tampering.

The application identity is generated based on the signed hashes. The application identity is utilized to define rules for validating the application. The application may be an application, a service, a function, a software container (e.g., an application container), a group of software containers, or any virtual instance executed in a cloud computing platform.

At runtime, the application identity is verified using the signed cryptographic hashes of its application identity. More specifically, an application identity of an application is correlated to a known application based on its runtime properties, and each system running an application involved in inter-system communications may provide an application identity for its respective application to a policy enforcer (e.g., either directly or via an agent configured to manage application identities). The policy enforcer is configured to verify that the applications identified by the respective application identities are communicating in accordance with one or more policies. In some implementations, each system running one of the communicating applications may run an instance of the policy enforcer.

FIG. 1 illustrates an example network diagram 100 utilized to describe the various disclosed embodiments. In the example network diagram 100, an identity signing device (ISD) 110 communicates with one or more artifacts databases (DB) 120 and a cloud computing platform 130. In some example configurations, the identity signing device 110 is further connected to various external systems 140. The external systems 140 may include, but are not limited to, public repositories maintaining software packages and executable files. Examples for such systems may include CentOs® Vault and Ubuntu® Packages. The external systems 140 may include a data source maintaining classified artifacts as further explained below.

The connection between the identity signing device 110, the artifacts database 120, and the platform 130 may be over a network 160. The network 160 may be, but is not limited to, a wireless, cellular or wired network, a local area network (LAN), a wide area network (WAN), a metro area network (MAN), the Internet, the worldwide web (WWW), similar networks, and any combination thereof.

The artifacts database 120 includes artifacts such as files for continuous integration (CI) tools, continuous delivery (CD) tools, or both. The tools of the artifacts database 120 are utilized for deployment, testing, and integration of software applications, services, or functions (collectively referred to as "cloud applications") in the cloud computing platform 130. The cloud computing platform 130 may include, but is not limited to: a public cloud, a private cloud, or a hybrid cloud. Examples for public cloud computing platforms may include Amazon Web Services™, Microsoft® Azure™, Google® Cloud Platform™, and the like.

The cloud computing platform 130 may include a number of virtualized environments 135 that may or may not belong to a specific tenant. In the example network diagram 100, the virtualized environments 135 include a first virtualized environment 135-1 and a second virtualized environment 135-2. As a non-limiting example, the first virtualized environment 135-1 may be a production environment, while the second virtualized environment 135-2 may be an environment for the maintenance of sensitive personal information. The virtualized environments 135 each host one or more respective cloud applications 131.

According to the disclosed embodiments, some or all of the cloud applications 131 in each of the virtualized environments 135 are configured by having securely signed application identities, i.e., application identities including signatures used for verifying an application's identity at runtime.

Each application identity is generated by the identity signing device 110 and include at least securely signed images (not shown) of a respective cloud application 131. In an embodiment, the securely signed images are created by signing one or more artifacts (not shown) of the cloud application 131 and generating an image based on the cloud application 131 including the signed artifacts. The signed artifacts are signed hashes of artifacts used for executing an application. In some configurations, cloud applications 131 having securely signed application identities communicate with each other over a point-to-point communication channel (not shown).

It should be appreciated that hashes of any application identity securely signed by the identity signing device 110 are decoupled from any policy defined in the cloud computing platform 130. The process for securely signing a cloud application 131 is further decoupled from verification of the application identity. In an embodiment, verification of the cloud application 131 is performed at runtime, e.g., when access to the application is requested.

The identity signing device 110 is configured to securely sign the operating system (OS) and artifacts of each cloud application 131. In an example implementation, the artifacts that are signed and verified are files. Example artifacts include, but are not limited to, executable files (e.g., libraries, scripts, software containers, etc.), configuration files, log files, other writable files, combinations thereof, and the like. The executable files may include executable files originating from an external source, executable files developed by a developer of the cloud application 131. These executable files are usually not changed and are contained in the basic image of a cloud application 131. The artifacts may further include runnable artifacts retrieved from the artifacts database 120. These artifacts are the runtime or executable files developed by the customer and built during a CI process. The artifacts may further include configuration files, some of which can be changed during runtime and some of which cannot.

In an embodiment, at least some of the artifacts of each cloud application 131 are signed offline by the identity signing device 110 using the process described herein. The identity signing device 110 is configured to classify artifacts of a cloud application 131 received from the artifacts database 120 during a continuous integration and continuous delivery or deployment (CI/CD) phase. In an embodiment, the classification is performed to identify artifacts that can be securely signed as signable artifacts. The classification may be performed using a set of heuristics.

The identity signing device 110 is configured to sign any artifact classified as a signable artifact. In an embodiment, the identity signing device 110 is further configured to spawn-up a machine in the CI/CD phase, thereby allowing the signable artifacts and image OS to be securely signed. In an embodiment, the pairs of keys for signing the OS files and for signing signable artifacts in the CI/CD phase are different. In this regard, it is noted that the relative amount of access and use of keys for signing files may increase the likelihood of tampering with the keys. Thus, in some embodiments, due to the frequency of their access and their use, different keys may be used for signing the OS files and CI/CD.

In various embodiments, each virtualized environment 135 may be configured with one or more policy enforcers 132. Each policy enforcer 132 is configured to enforce a policy based on application identities provided in accordance with the disclosed embodiments. More specifically, each policy enforcer 132 is configured to verify each application in a communication and to confirm that the communication between the application, the execution of the application, or both, meets one or more policy requirements based on its application identity. An example operation of a policy enforcer 132 is described further below with respect to FIG. 6. Each policy enforcer 132 may be further configured to analyze the application identity and an environment of each application to be execution in the environment to confirm that the execution of the application in the environment meets one or more policy requirements.

It should be noted that the example network diagram 100 is described with respect to the nodes in a single cloud computing platform 130 and a single identity signing device 110 merely for simplicity and without limitation on the disclosed embodiments. More or fewer cloud computing platforms, data centers, or both, may be protected without departing from the scope of the disclosure.

Figure 2:
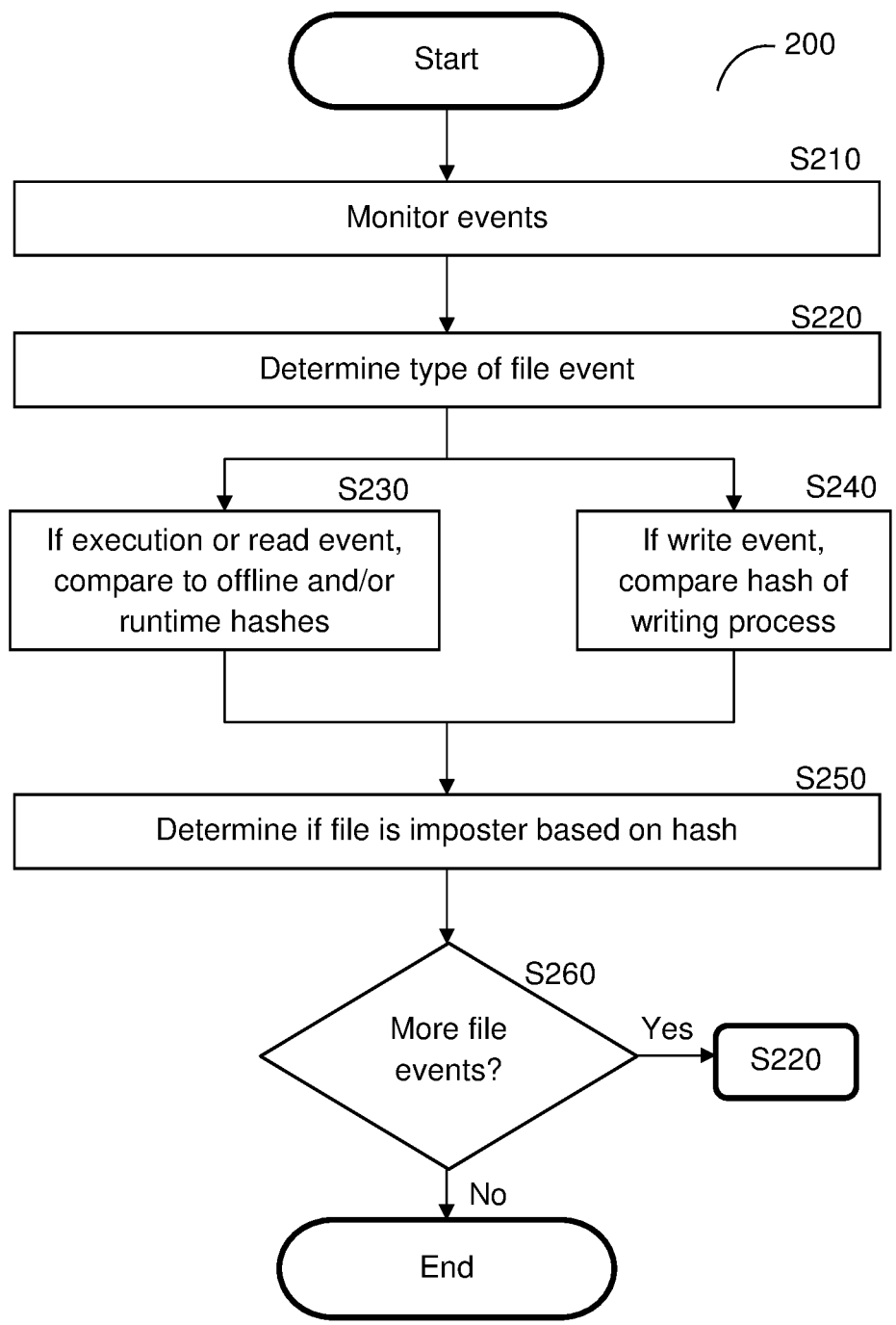
FIG. 2 is a flowchart illustrating a method for establishing runtime properties of an application identity according to an embodiment.

FIG. 2 is an example flowchart 200 illustrating a method for identifying imposter files in file events according to an embodiment.

At S210, events within an identity-based security platform are monitored in order to identify one or more file events. The monitored events may include operating system events such as, but not limited to, process lifecycle events (e.g., fork, exec, exit, etc.), file events (e.g., create, open, close, etc.), software container orchestration events (e.g., start, stop, update, etc.), combinations thereof, and the like.

In an embodiment, the monitoring of process and file events begins at the start of a system boot and includes monitoring the following operating system (OS) events: process lifecycle events (e.g., a fork, an exec, an exit, etc.) and file events (e.g., opening, creating, writing, closing, etc.). For each event, the monitoring may include receiving the arguments of the event and may further include storing an updated state for each running process (forked/executed/exited), an updated state for each opened file (including which process opened it), the event flags and mode (read/write/both), the current state of the file, the last state timestamp, a combination thereof, and the like.

At S220, a type of a file event identified during the monitoring is determined. Example types of file events may include, but are not limited to, an execution event, a file read event, and a file write event. In an embodiment, if an execution event or a file read event is detected, the method continues at S230; and if a file write event is detected, the method continues at S240.

The monitoring includes creating or updating a process map having a key and a process structure value. The key may be a user space process identifier (PID). The process structure value may include, but is not limited to, a thread group ID (TGID), a PID, a state (e.g., forked, executed, exited, etc.), and relevant execution data. For processes in an "executed" state (e.g., following an exec event), the monitoring may include storing various execution data such as, but not limited to, a process universally unique identifier (UUID) such as UUID5 that is generated from an original TGID, a start time, an executable path and arguments, an original TGID of the executed process, a process name, an executable path, an arguments list, a current working directory (CWD), a start time of the process, an end time of the process, an application identifier (ID), a reference list of all processes that are pointing to this execution data, combinations thereof, and the like. In an embodiment, for processes in a "forked" state, the execution data will point to the execution data of the parent process.

At S230, when the file event is determined to be a file read event or an execution event, a runtime hash is generated for each file of the event and the runtime hash is compared to one or more trusted hashes.

When the event is determined to be a file read event, a runtime hash of each file of the event is generated and compared against a list of offline signatures, known trusted runtime hash values, or both. As a non-limiting example, the file read event may include opening of a file to read the contents thereof without writing to the file. The list of offline signatures may be previously generated and stored, e.g., within a database. The known trusted runtime hash values may be hash values that were previously generated based on a prior event involving the file and stored in a database, for example after a file write event has occurred as described below.

When the event is determined to be an execution event, a runtime hash of the binary executing each file (e.g., as found in the filepath argument) is generated and compared against a list of offline signatures or known runtime hash values.

At S240, when the event is determined to be a write event, a runtime hash for the process that opened the file is generated and compared to hashes within a list of offline signatures or known runtime hash values.

In an embodiment, S240 further includes generating a runtime hash for a file of the write event based on the last known state of the file for write events (e.g., a state after the most recent write event involving writing to the file). The hashes can be stored under the key, which is the path of the file. The hashes of the modified files that have been opened for writing will not be present in the offline hashes, so in order not to be considered as impostors, the files that are opened by trusted processes also need to be mapped as trusted using a runtime hashes map. Because the monitoring agent is trusted and the runtime hashes can be modified only by the monitoring agent, the runtime hashes will be also considered as trusted like the offline hashes are. Thus, when subsequent file events are identified, their respective hashes may be compared to a list of known trusted runtime hash values including hash values generated after the most recent modification of respective files.

At S250, it is determined whether the identified file event includes an imposter. In an embodiment, the identified file event is determined as including an imposter when none of the determined hashes for the file event match a hash within a list of trusted offline signatures or runtime hashes. The hashes for the file event may include, for example, a hash of the file in the file read event or a hash of a relevant binary or process (e.g., a write process). If a matching hash is found, the file event is determined to not be an imposter and allowed to proceed. In an embodiment, when a file event is determined to not be an imposter, the hash of each file in the identified file event may be added to the known trusted runtime hashes list.

In an embodiment, when the identified file event is determined not to be an imposter, the hashes of the files of the file event are added to an application identity for the application. Because the file event occurs at runtime, the hashes of its files effectively represent runtime properties of the application. Thus, adding such hashes provides the application identity with the runtime properties of the application which help further define the application in addition to the static files. By analyzing file events, the disclosed embodiments allow for effectively determining the actual runtime properties of the application.

At S260, it is determined if more file events have been identified and, if so, execution continues with S220; otherwise, execution terminates. It should be noted that FIG. 2 is depicted as analyzing each file event in series, but multiple file events may be equally analyzed as described with respect to steps S220 through S250 in parallel without departing from the scope of the disclosure.

Figure 3:
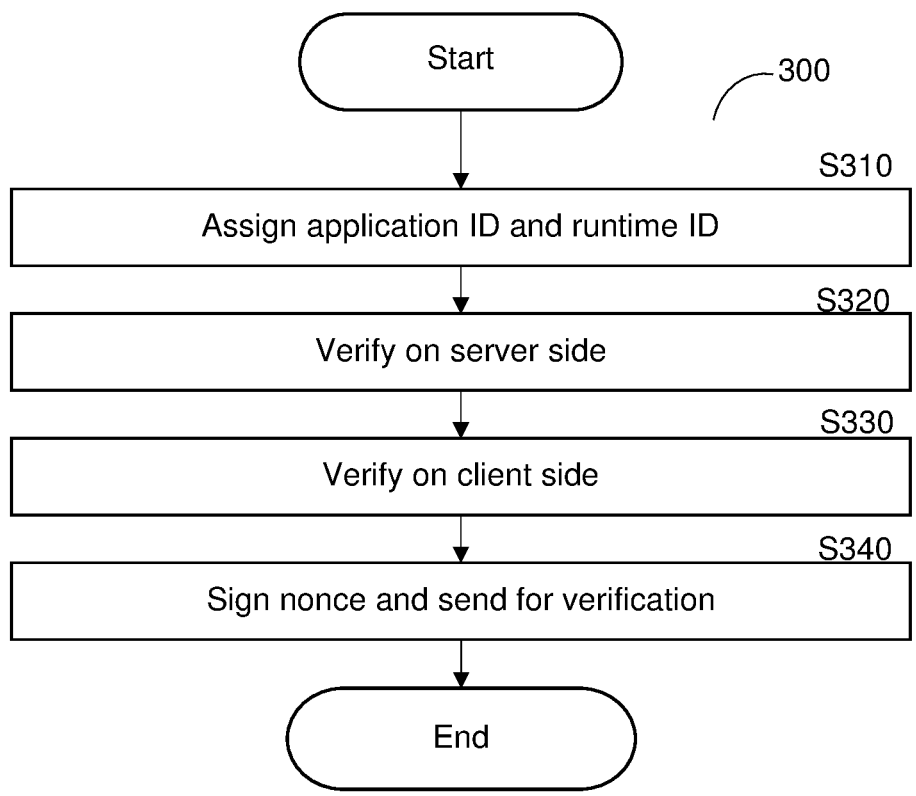
FIG. 3 is a flowchart illustrating a method for verifying application identities to establish an application identity according to an embodiment.

FIG. 3 is an example flowchart 300 illustrating a method for verifying an application according to an embodiment. In an embodiment, the method is performed by the identity signing device 110, FIG. 1.

At S310, an application identifier (ID) and a runtime ID are assigned to an application. In an embodiment, the application identifier is defined automatically during the offline signing phase as described above with respect to FIG. 1 and below with respect to FIG. 5.

For each user-defined instance of an application, a unique runtime ID is assigned. Runtime IDs can be defined by process characteristics such as, but not limited to, a process name, a list of associated files including path and hash, command line arguments, and a working directory.

For every file event (process "exec" or file open), the execution parameters are matched to the process characteristics of the predefined applications. The matching result is utilized as the application ID for the application.

The runtime ID includes, but is not limited to, a matched application ID, an agent certificate (e.g., a certificate of a monitoring agent issued by an administrator), a connection ID and a challenge-response nonce, a signature on the above using an agent's private key associated to the certificate, a combination thereof, and the like.

In an embodiment, S310 further includes verifying communications between two machines on a network (e.g., a client and a server). The verification includes, on the server side, creating a runtime application identity as described above upon execution of a process by the server. The verification may further include, on the client side, creating a runtime application identity as described above upon execution of a client application using a randomly generated unique connection ID with a generated nonce.

At S320, an identity of the client is verified on the server side. To this end, on the client side, a runtime identity of the client is injected into the beginning of traffic being sent to the server. Upon receiving the client runtime identity, an agent on the server side verifies the identity of the client by verifying any or all of the following: that the client certificate is trusted and valid, that the identity signature for the application is valid and matches the public key in the certificate, that the nonce is valid, that the client application is allowed to communicate with the destined server application, and that the client environment is allowed to communicate with the destined server application or environment. In an embodiment, if any of the foregoing items are not verified, the client identity is not verified and the connection may be terminated.

At S330, a challenge-response nonce is generated and added to a corresponding application identity representing the identity of the server such that the identity of the server can be identified on the client side. The server application identity is injected into the beginning of traffic being sent to the client. Upon receiving the server identity, the agent on the client side may verify any or all of the following: that the server certificate is trusted and valid, that the identity signature is valid and matches the public key in the server certificate, that the client nonce signed by the server is valid, that the client application is allowed to communicate with the destined server application, and that the client environment is allowed to communicate with the destined server application or environment. If the server application identity is not valid, client side agent may terminate the connection.

At S340, signed nonces are received from the client and verified. To this end, the client signs both the server and the client nonce, and sends each signed nonce to the server. The server verifies the nonces signed by the client and, if one or more of the nonces is not valid, the connection is terminated.

According to the disclosed embodiments, the application identity of an entity is fully decoupled from any particular policy and from a validation algorithm implemented on the receiving counterpart. Further, all information signed by the agent can be signed using asymmetric encryption. This allows for protecting against data tampering and man-in-the-middle attacks. The signatures can additionally contain the current time for handling replay attacks. All communication between agents within a system can be signed with asymmetric encryption, where local agents verify the identity of remote agents, e.g., via short-lived prosperity certificates.

The disclosed embodiments further prevent offline stealing of disks (e.g., via image clone) because the runtime signing key is encrypted. In an embodiment, the encryption key is held in a management system. In case of a system reboot, an agent may request the secret from an admin to decrypt the private key used for signing. It may be determined if the request is sent from a non-approved device and, if so, the attacker will not be able to receive the key and thus decrypt the private key signing.

Figure 4:
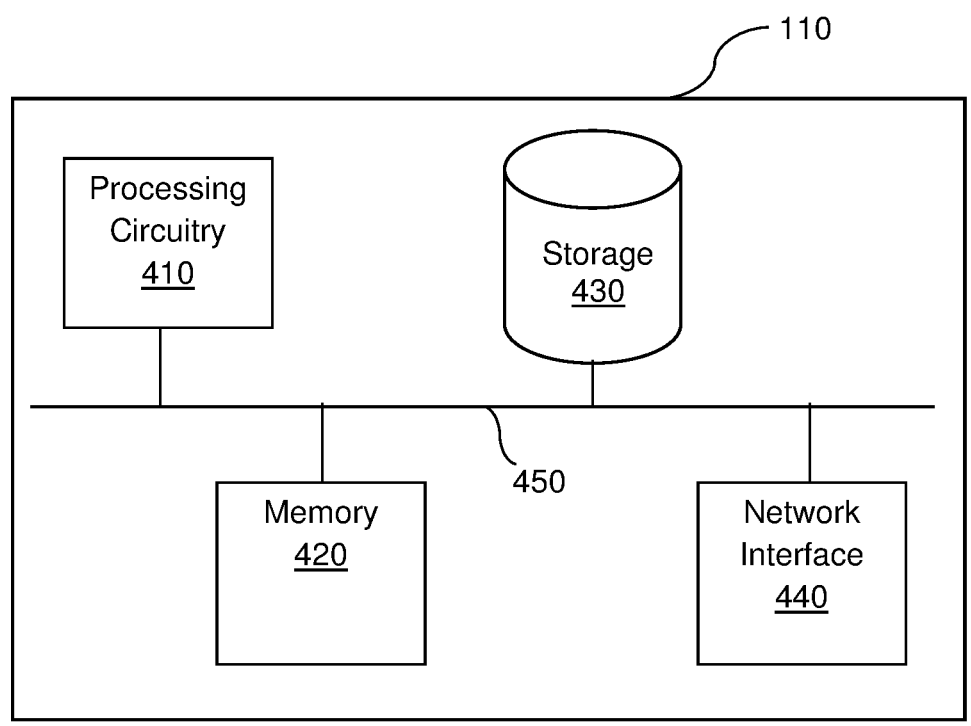
FIG. 4 is a schematic diagram of an identity signing device according to an embodiment.

FIG. 4 is an example schematic diagram of the identity signing device 110 according to an embodiment. The identity signing device 110 includes a processing circuitry 410 coupled to a memory 420, a storage 430, and a network interface 440. In an embodiment, the components of the identity signing device 110 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, and the like. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information. The network interface 440 allows the identity signing device 110 to communicate with the artifacts database 120, external systems 140, and the cloud computing platform 130.

Figure 5:
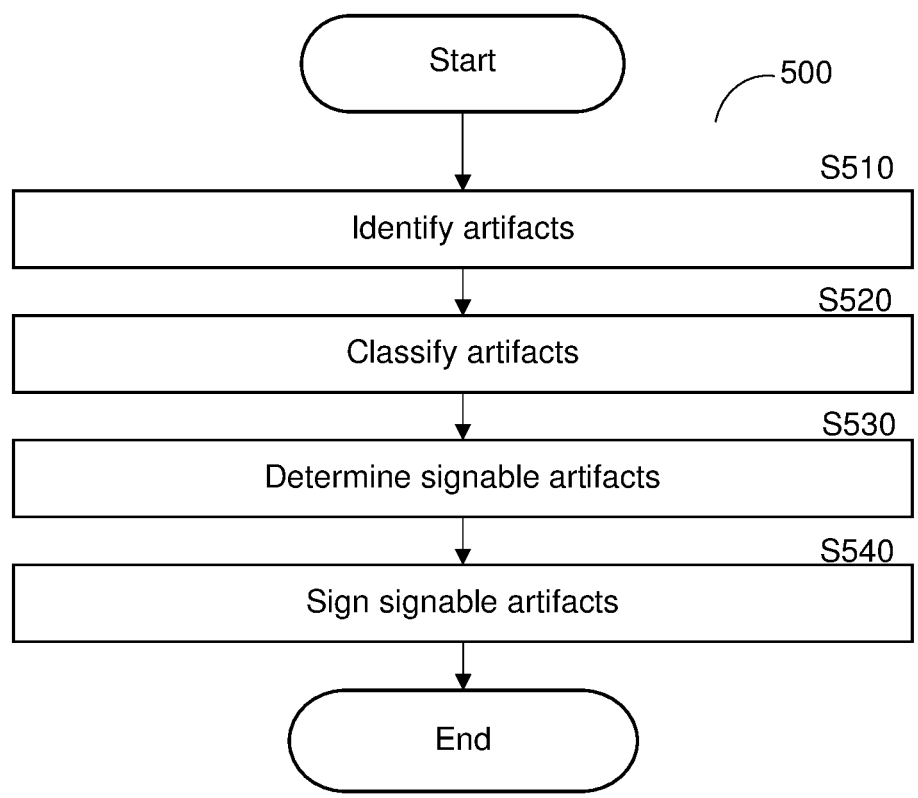
FIG. 5 is an example flowchart illustrating a method for signing artifacts according to an embodiment.

FIG. 5 is an example flowchart 500 illustrating a method for signing artifacts according to an embodiment. In an embodiment, the method is performed by the identity signing device 110, FIG. 1.

At S510, artifacts of an application to be assigned an application identity are identified. The artifacts are data used to execute the application and may be, but are not limited to, files.

At S520, the identified artifacts are classified. In an example implementation, artifacts may be classified into one of various categories of artifacts which may or may not typically be modified at runtime. In some implementations, the classification may be determined based on status identifiers of the artifacts. Alternatively or collectively, the classification may be determined based on known writable and read-only artifacts, known properties of writable and read-only artifacts, combinations thereof, and the like.

Example classifications may include, but are not limited to, runnable artifacts from external sources, runnable artifacts from CI/CD, changeable configuration files, non-changeable configuration files, log files and other writable files.

At S530, one or more signable artifacts are determined from among the identified artifacts. In an embodiment, files which are not typically modified at runtime are determined as signable. In an example implementation, such signable artifacts include artifacts classified as runnable artifacts from external sources, runnable artifacts from CI/CD, and non-changeable configuration artifact.

At S540, the signable artifacts are signed. In an embodiment, S540 includes generating a cryptographic hash representing each signable artifact and signing each generated hash using, for example, a private key.

Figure 6:
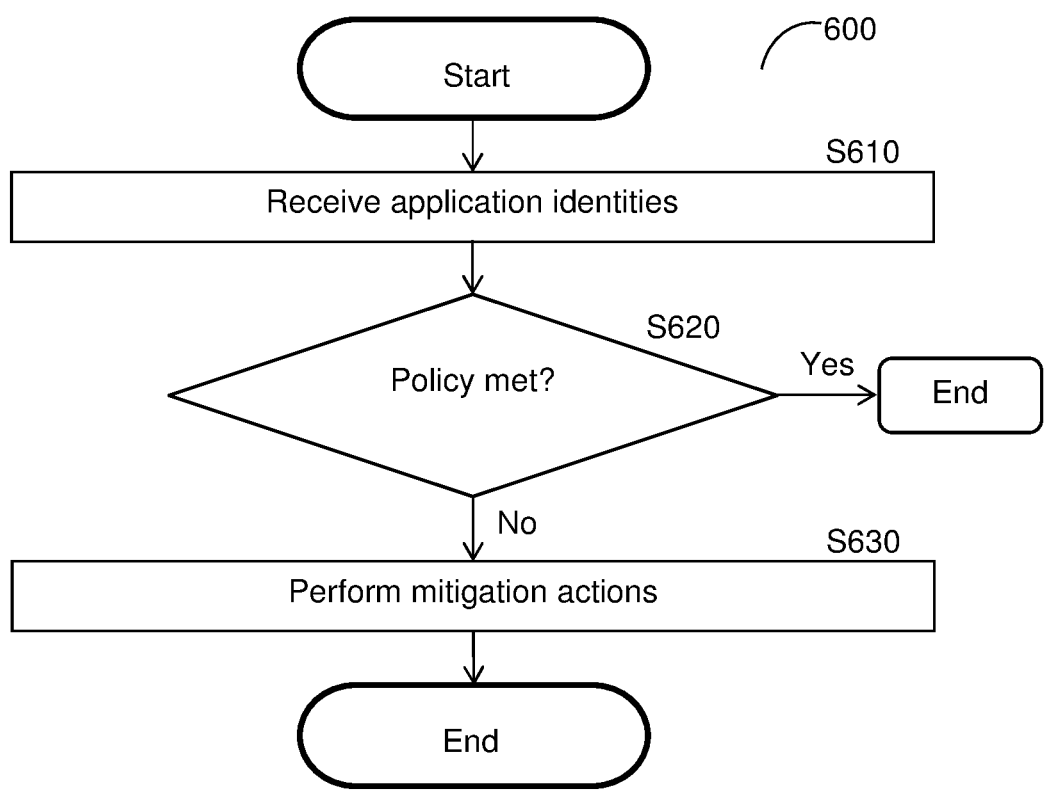
FIG. 6 is an example flowchart illustrating a method for enforcing a policy based on application identities according to an embodiment.

FIG. 6 is an example flowchart 600 illustrating a method for enforcing a policy based on application identities according to an embodiment. In an embodiment, the method of FIG. 6 is performed by a policy enforcer 132, FIG. 1. An instance of the method may further be performed by a respective policy enforcer 132 deployed alongside each application participating in communication to ensure that the communications with the other application are in accordance with any applicable policies.

At S610, application identities of applications communicating with each other are received. In an example implementation, the application identities are received from one of the applications in the communication. The application identities include at least signed artifacts and hashes of runtime files as described above with respect to FIGS. 2 and 5, and may further be verified using, for example, public/private key pairs to verify nonces as described above with respect to FIG. 3.

At S620, based on the application identities, it is determined whether the communications between the applications meet one or more requirements defined in policies applicable to the communicating applications and, if so, execution terminates; otherwise, execution continues with S630. The policy requirements may include, but are not limited to, rules for applications communicating in certain environments, rules for specific applications, both, and the like.

At S630, when it is determined that the communication between the application does not meet the applicable policy requirements, one or more mitigation actions are performed. The mitigation actions may include, but are not limited to, terminating communications, severing a connection, adding the other application to a blocked list, combinations thereof, and the like.

It should be noted that the methods of FIGS. 2, 3, 5, and 6 may be performed by different entities or the same entity without departing from the scope of the disclosure. In an example implementation, the method of FIG. 5 is performed by the identity signing device 110, the methods of FIGS. 2 and 3 are each performed by agents (not shown in FIG. 1) deployed alongside the cloud applications 131, and the method of FIG. 6 is performed by a policy enforcer 132 deployed alongside a respective cloud application 131 in a virtualized environment 135. In an alternative implementation, each cloud application 131 may be configured to perform the methods of FIGS. 2, 3, and 6. In another alternative implementation, each cloud application 131 may be configured to perform the methods of FIGS. 2, 3, and 5. In yet another alternative implementation, each cloud application 131 may be configured to perform the methods of FIGS. 2, 3, 5, and 6. In another alternative implementation.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for establishing application identities including application runtime properties, comprising:
    signing at least one artifact of a first application communicating with a second application, wherein each of the at least one artifact includes data used for executing the first application, wherein a signing result of each artifact is a signed cryptographic hash of the artifact;
    monitoring events related to communications between the first application and the second application to identify a file event;
    generating at least one runtime hash for the file event, wherein the at least one runtime hash represents runtime properties of the first application;
    generating an application identity for the first application, the application identity for the first application including the signed cryptographic hash of each of the at least one artifact and the at least one runtime hash of the file event;
    providing the application identity for the first application to a policy enforcer, wherein the policy enforcer is configured to enforce at least one policy based on the provided application identity for the first application.

2. The method of claim 1, further comprising:
    receiving an application identity for the second application from the second application, wherein the application identity for the second application is also provided to the policy enforcer, wherein the policy enforcer is configured to enforce the at least one policy based further on the provided application identity for the second application.

3. The method of claim 1, wherein each of the at least one artifact is a signable artifact, wherein each signable artifact is an artifact which is not modified at runtime of the first application.

4. The method of claim 3, wherein signing the at least one artifact further comprises:
    classifying a plurality of artifacts of the first application;
    determining, based on the classification, the at least one signable artifact;
    generating a cryptographic hash of the at least one signable artifact; and
    signing the cryptographic hash of each of the at least one signable artifact.

5. The method of claim 4, wherein a classification of each of the at least one signable artifact is any of: runnable artifact from an external source, runnable artifact from a continuous integration and continuous deployment phase, and non-changeable configuration artifact.

6. The method of claim 1, further comprising:
determining whether the file event includes an imposter file, wherein it is determined that the file event includes an imposter file when none of the at least one runtime hash for the file event matches a known file hash.

7. The method of claim 6, further comprising:
determining a type of the file event, wherein the at least one runtime hash is generated based on the determined type of the file event.

8. The method of claim 7, wherein the type of the file event is determined as a write event, wherein the at least one runtime hash is a hash of a process that opened a file of the file event.

9. A non-transitory computer readable medium having stored thereon instructions for causing a processing circuitry to execute a process, the process comprising:
signing at least one artifact of a first application communicating with a second application, wherein each of the at least one artifact includes data used for executing the first application, wherein a signing result of each artifact is a signed cryptographic hash of the artifact;
monitoring events related to communications between the first application and the second application to identify a file event;
generating at least one runtime hash for the file event, wherein the at least one runtime hash represents runtime properties of the first application;
generating an application identity for the first application, the application identity for the first application including the signed cryptographic hash of each of the at least one artifact and the at least one runtime hash of the file event;
providing the application identity for the first application to a policy enforcer, wherein the policy enforcer is configured to enforce at least one policy based on the provided application identity for the first application.

10. A system for establishing application identities including application runtime properties, comprising:
a processing circuitry; and
a memory, the memory containing instructions that, when executed by the processing circuitry, configure the system to:
sign at least one artifact of a first application communicating with a second application, wherein each of the at least one artifact includes data used for executing the first application, wherein a signing result of each artifact is a signed cryptographic hash of the artifact;
monitor events related to communications between the first application and the second application to identify a file event;
generate at least one runtime hash for the file event, wherein the at least one runtime hash represents runtime properties of the first application;
generate an application identity for the first application, the application identity for the first application including the signed cryptographic hash of each of the at least one artifact and the at least one runtime hash of the file event;
provide the application identity for the first application to a policy enforcer, wherein the policy enforcer is configured to enforce at least one policy based on the provided application identity for the first application.

11. The system of claim 10, wherein the system is further configured to:
receive an application identity for the second application from the second application, wherein the application identity for the second application is also provided to the policy enforcer, wherein the policy enforcer is configured to enforce the at least one policy based further on the provided application identity for the second application.

12. The system of claim 10, wherein each of the at least one artifact is a signable artifact, wherein each signable artifact is an artifact which is not modified at runtime of the first application.

13. The system of claim 12, wherein the system is further configured to:
classify a plurality of artifacts of the first application;
determine, based on the classification, the at least one signable artifact;
generate a cryptographic hash of the at least one signable artifact; and
sign the cryptographic hash of each of the at least one signable artifact.

14. The system of claim 13, wherein a classification of each of the at least one signable artifact is any of: runnable artifact from an external source, runnable artifact from a continuous integration and continuous deployment phase, and non-changeable configuration artifact.

15. The system of claim 10, wherein the system is further configured to:
determine whether the file event includes an imposter file, wherein it is determined that the file event includes an imposter file when none of the at least one runtime hash for the file event matches a known file hash.

16. The system of claim 15, wherein the system is further configured to:
determine a type of the file event, wherein the at least one runtime hash is generated based on the determined type of the file event.

17. The system of claim 16, wherein the type of the file event is determined as a write event, wherein the at least one runtime hash is a hash of a process that opened a file of the file event.

* * * * *